(12) United States Patent
Lee et al.

(10) Patent No.: US 8,657,686 B2
(45) Date of Patent: Feb. 25, 2014

(54) SYNTHETIC ENVIRONMENT CHARACTER DATA SHARING

(75) Inventors: Robert Ernest Lee, Austin, TX (US); Jon Edward Van Caneghem, Menlo Park, CA (US); Bryan Joseph Farina, Foster City, CA (US); Erin E. Turner, San Francisco, CA (US); Peter Chi-Hao Huang, Menlo Park, CA (US)

(73) Assignee: Trion Worlds, Inc., Redwood City, CA (US)

( * ) Notice: Subject to any disclaimer, the term of this patent is extended or adjusted under 35 U.S.C. 154(b) by 777 days.

(21) Appl. No.: 12/399,903

(22) Filed: Mar. 6, 2009

(65) Prior Publication Data

US 2010/0227688 A1 Sep. 9, 2010

(51) Int. Cl.
*G07F 17/32* (2006.01)

(52) U.S. Cl.
USPC ............................................. 463/42

(58) Field of Classification Search
USPC ............................................ 463/42; 709/220
See application file for complete search history.

(56) References Cited

U.S. PATENT DOCUMENTS

| | | |
|---|---|---|
| 5,819,034 A | 10/1998 | Joseph et al. |
| 5,851,149 A | 12/1998 | Xidos et al. |
| 5,915,090 A | 6/1999 | Joseph et al. |
| 5,987,466 A | 11/1999 | Greer et al. |
| 6,015,348 A | 1/2000 | Lambright et al. |
| 6,052,455 A | 4/2000 | James |
| 6,175,842 B1 | 1/2001 | Kirk et al. |
| 6,751,212 B1 | 6/2004 | Kaji et al. |
| 6,757,696 B2 | 6/2004 | Multer et al. |
| 6,816,787 B2 | 11/2004 | Ramamoorthy et al. |
| 6,883,168 B1 | 4/2005 | James et al. |
| 6,892,230 B1 | 5/2005 | Gu et al. |
| 7,168,035 B1 | 1/2007 | Bell et al. |
| 7,373,377 B2 | 5/2008 | Altieri |
| 7,471,947 B1 | 12/2008 | Papineu |
| 7,502,843 B2 | 3/2009 | Kirstein et al. |

(Continued)

FOREIGN PATENT DOCUMENTS

| | | |
|---|---|---|
| EP | 0680182 | 11/1995 |
| RU | 2236702 | 9/2004 |
| WO | 2008109132 | 9/2008 |

OTHER PUBLICATIONS

Kuester et al., Virtual Explorer: A Plugin-Based Virtual Reality Framework, SPIE Proceedings, The International Society for Optical Engineering, vol. 4297, Jan. 22, 2001.

(Continued)

*Primary Examiner* — Thomas L Dickey
(74) *Attorney, Agent, or Firm* — Van Pelt, Yi & James LLP

(57) ABSTRACT

Synthetic environment character data sharing is described, including retrieving data from a first computer configured to interact with a synthetic environment by a game server, the first computer and the game server being in data communication with each other and configured using a client-server network topology, determining one or more attributes associated with the first computer relative to the synthetic environment in real-time or substantially real-time by accessing a file updated by the first computer, the file being stored on the game server, and generating a display on a second computer using the data, the display being presented using a synthetic environment mapping application, including at least a location and a login status associated with the first computer relative to the synthetic environment.

23 Claims, 15 Drawing Sheets

(56) References Cited

U.S. PATENT DOCUMENTS

| | | |
|---|---|---|
| 7,818,077 B2 | 10/2010 | Bailey |
| 8,026,918 B1 | 9/2011 | Murphy |
| 2003/0058238 A1 | 3/2003 | Doak et al. |
| 2003/0108022 A1 | 6/2003 | Yamamoto |
| 2003/0167305 A1 | 9/2003 | Zhu et al. |
| 2003/0177187 A1 | 9/2003 | Levine et al. |
| 2004/0076178 A1 | 4/2004 | Botton |
| 2004/0103141 A1 | 5/2004 | Miller et al. |
| 2004/0193441 A1 | 9/2004 | Altieri |
| 2005/0068167 A1 | 3/2005 | Boyer et al. |
| 2005/0193120 A1 | 9/2005 | Taylor |
| 2005/0209002 A1* | 9/2005 | Blythe et al. ............ 463/42 |
| 2005/0272492 A1 | 12/2005 | Stelly |
| 2006/0014585 A1 | 1/2006 | Neogi |
| 2006/0135259 A1 | 6/2006 | Nancke-Krogh et al. |
| 2006/0146848 A1 | 7/2006 | Kirstein et al. |
| 2006/0274784 A1 | 12/2006 | Hsueh et al. |
| 2006/0287096 A1 | 12/2006 | O'Kelley et al. |
| 2007/0117630 A1 | 5/2007 | Fowler et al. |
| 2007/0130150 A1 | 6/2007 | Fowler et al. |
| 2007/0173327 A1 | 7/2007 | Kilgore et al. |
| 2007/0191103 A1 | 8/2007 | Van Luchene |
| 2007/0218987 A1 | 9/2007 | Van Luchene et al. |
| 2007/0265091 A1 | 11/2007 | Aguilar et al. |
| 2008/0009345 A1 | 1/2008 | Bailey et al. |
| 2008/0026845 A1 | 1/2008 | Aguilar et al. |
| 2008/0026847 A1 | 1/2008 | Mueller et al. |
| 2008/0090659 A1 | 4/2008 | Aguilar et al. |
| 2008/0176655 A1 | 7/2008 | James et al. |
| 2008/0207327 A1 | 8/2008 | Van Luchene et al. |
| 2008/0220873 A1* | 9/2008 | Lee et al. ............ 463/42 |
| 2008/0294417 A1 | 11/2008 | Brunstetter et al. |
| 2008/0294782 A1 | 11/2008 | Patterson et al. |
| 2009/0006566 A1 | 1/2009 | Veeramachaneni et al. |
| 2009/0017916 A1 | 1/2009 | Blanchard et al. |
| 2009/0055369 A1* | 2/2009 | Phillips et al. ............ 707/4 |
| 2009/0089439 A1 | 4/2009 | Benco et al. |
| 2009/0111576 A1 | 4/2009 | Ostergren et al. |
| 2009/0125481 A1 | 5/2009 | Mendes da Costa et al. |
| 2009/0131177 A1 | 5/2009 | Pearce |
| 2009/0176557 A1 | 7/2009 | Hall et al. |
| 2009/0199275 A1 | 8/2009 | Brock et al. |
| 2009/0209335 A1 | 8/2009 | Pearce |
| 2009/0215433 A1 | 8/2009 | Cavanaugh et al. |
| 2009/0231112 A1 | 9/2009 | Baalbergen et al. |
| 2009/0235176 A1* | 9/2009 | Jayanthi ............ 715/738 |
| 2009/0239556 A1 | 9/2009 | Sennett et al. |
| 2009/0253494 A1 | 10/2009 | Fitch et al. |
| 2009/0287640 A1 | 11/2009 | Hamilton et al. |
| 2009/0300525 A1 | 12/2009 | Jolliff et al. |
| 2009/0319668 A1 | 12/2009 | Hamilton et al. |
| 2009/0325712 A1 | 12/2009 | Rance |
| 2010/0009703 A1* | 1/2010 | Sornay ............ 455/466 |
| 2010/0041481 A1 | 2/2010 | Smedley et al. |
| 2010/0203936 A1 | 8/2010 | Levy et al. |
| 2010/0251330 A1 | 9/2010 | Kroeselberg et al. |
| 2010/0255916 A1 | 10/2010 | Sioufi Filho |
| 2010/0274914 A1 | 10/2010 | Birch et al. |
| 2010/0299615 A1* | 11/2010 | Miluzzo et al. ............ 715/752 |
| 2011/0041153 A1 | 2/2011 | Simon et al. |
| 2012/0079046 A1 | 3/2012 | Murphy |
| 2012/0084364 A1 | 4/2012 | Sivavakeesar |
| 2013/0133087 A1 | 5/2013 | Proctor et al. |

OTHER PUBLICATIONS

International Search Report and Written Opinion for PCT/US2008/003055, Aug. 11, 2008.

International Search Report and Written Opinion for PCT/US2008/003000, Jun. 26, 2008.

Roger McFarlane, Network Software Architectures for Real-Time Massively-Multiplayer Online Games, Feb. 2, 2005.

Engtech, How to Get an RSS Feed for your XBOX 360 Gamertag, Mar. 31, 2008, pp. 1-7.

Duncan Mackenzie, Connect your XBOX 360 Gamertag to Twitter, May 11, 2007, pp. 1-5.

Psychostats, PsychoStats, Oct. 11, 2007, pp. 1-2.

Blizzard, The Armory, Oct. 2, 2007, pp. 1-3.

* cited by examiner

SYNTHETIC ENVIRONMENT CHARACTER DATA SHARING

CROSS-REFERENCES TO RELATED APPLICATIONS

This application is related to co-pending U.S. patent application Ser. No. 12/259,902, filed Oct. 28, 2008 and entitled "Persistent Synthetic Environment Message Notification," U.S. patent application Ser. No. 12/399/902, filed Mar. 6, 2009 and entitled "Cross-Interface Communication", and U.S. patent application Ser. No. 12/399,877, filed Mar. 6, 2009 entitled "Synthetic Environment Character Data Sharing," all of which are herein incorporated by reference for all purposes.

FIELD

The present invention relates generally to computer software, computer program architecture, synthetic environments, and data communication and networking. More specifically, techniques for synthetic environment character data sharing are described.

BACKGROUND

In conventional computer or online gaming, users (i.e., players or person playing a game, whether a PC/desktop, online, massively multiplayer online (e.g., MMO), or console game) typically create a character for interaction within a virtual world or game. During game play or within a game environment, users typically use characters represented visually by avatars to form or join guilds (e.g., an organized group of players working together), groups, temporary parties, units, or other social organizations to complete a specified quest, function, or goal. Formation of a guild or party assists users with game play, promotes camaraderie, and serves as a social networking and interactive tool for users. While playing a game or quest, guild or party members typically need to be cognizant or made aware of events, activities, or actions of other users within a virtual world. However, conventional solutions for sharing data or information between characters and users accounts are limited in features and functionality, often restricting or altogether prohibiting types, amounts, and the manner in which information and data associated with other characters are exchanged with other users and user accounts.

Some conventional solutions for sharing character data related to a computer or online game are limited in scope. Typically, a user is required to login (e.g., entering a user name, password, or performing another type of authentication in order to enter a game or other synthetic environment) to a game environment to access information regarding events or other players' activities. Although logged into a game, conventional solutions are typically not configured to dynamically share content such as real time character or user data, information, actions, and events. Other conventional solutions provide limited information regarding other users or character accounts. Typically, shared data related to a character is limited to a designation of whether or not the character is logged in or logged out of a game environment. Conventional solutions are also limited because readily available or useful geographic information cannot be shared with other users. Still further, conventional solutions are often inefficient, requiring manual configuration, entry of individual parameters, and time and labor-intensive efforts to establish filters, rules, or other mechanisms that determine how and when specific types of information are shared.

Further, conventional solutions often prevent users from sharing game, character, or other types of data or information outside of a game environment, often requiring users to be logged into the game environment. Typically, when users are logged into a game environment, conventional solutions are not configured to allow observation of another user's activities or events of other users (e.g., a battle occurring in another part of a virtual world of a game that may not involve both users). Still further, conventional games and gaming applications allow game data to be used only within a particular title, game, or shard.

Thus, what is needed is a solution for sharing character data and information without the limitations of conventional techniques.

BRIEF DESCRIPTION OF THE DRAWINGS

Various embodiments or examples ("examples") are disclosed in the following detailed description and the accompanying drawings.

DETAILED DESCRIPTION

Figure 1:
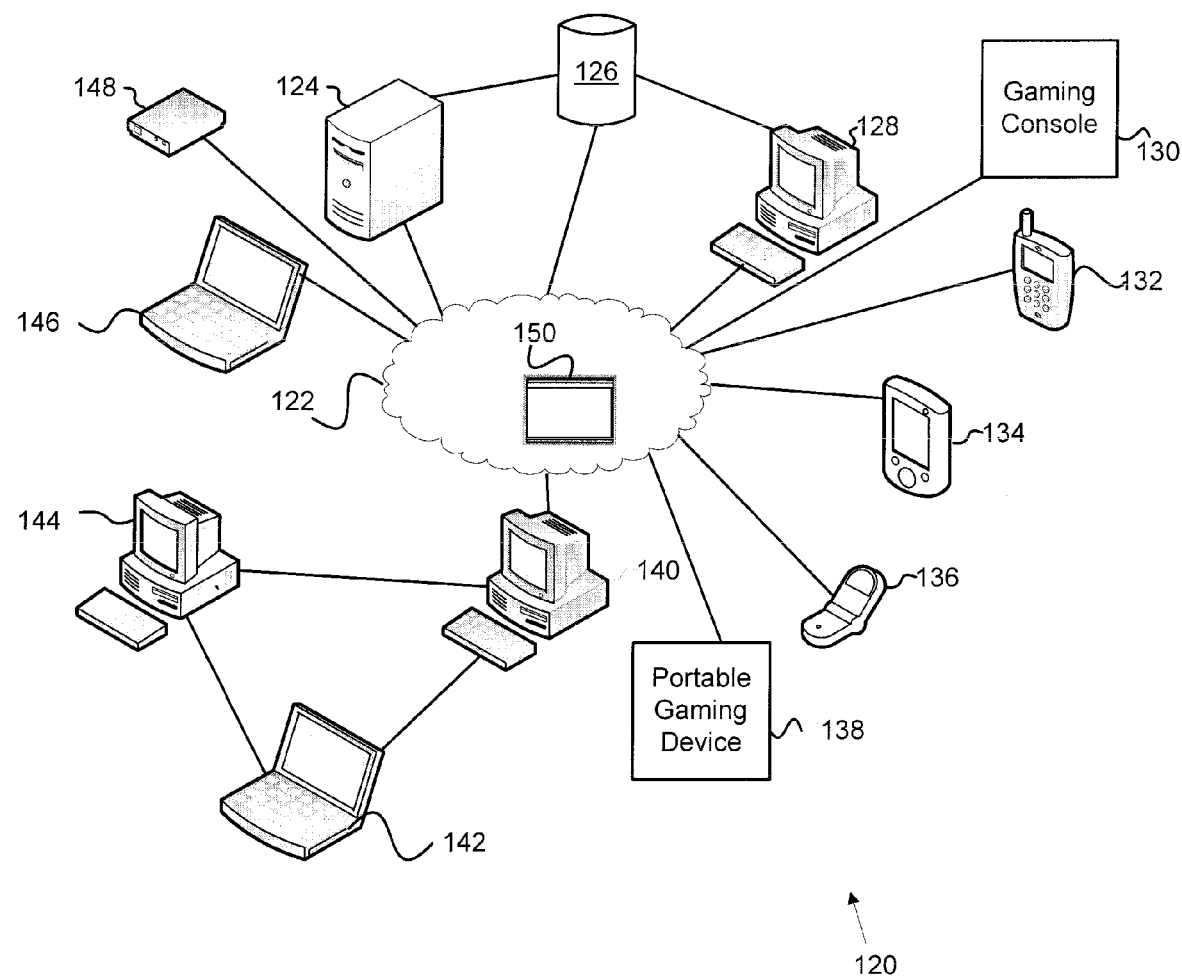
FIG. 1 illustrates an exemplary system for synthetic environment character data sharing.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Design, publishing, and other types of applications such as Dreamweaver®, Shockwave®, Flash®, Drupal and Fireworks® may also be used to implement the described techniques. The described techniques may be varied and are not limited to the examples or descriptions provided.

Techniques for synthetic environment character data sharing of data generated inside or outside of a virtual world, game, or other type of synthetic environment ("synthetic environment") are described. The described techniques may be implemented using a network of nodes, node processes, game servers and game sub-process servers such as those described in U.S. patent application Ser. No. 11/715,009, entitled "Distributed Network Architecture for Introducing Dynamic Content into a Synthetic Environment," filed Sep. 6, 2007, which is herein incorporated by reference for all purposes. Techniques for synthetic environment character data sharing may also include retrieving data from a number of sources, game platforms or titles (i.e., regardless of whether supported by a single game platform or implementation (e.g., console, MMO, MMORPG, MMOG, PC, desktop, and others)), storing data generated from an interaction between a character and a synthetic environment, and modifying the data to present information (e.g., visual, textual, audio, animated, or other type of content) for various types of clients, including web, mobile, desktop, or other types of end points and devices. In some examples, a synthetic environment may be a virtual world, game, or other simulated environment that, when implemented, provides a persistent virtual world (i.e., continuous forum for various purposes (e.g., gaming, combat simulation, social networking, community or world development, and others)) in which users may interact with various aspects, features, activities, and events using characters and avatars. As used herein, a "user" may refer to a profile, file, document, data, or data construct or structure that is configured to represent an account of a person using a synthetic environment, regardless of whether the person has accessed her account and if a login status indicates the user is logged into (i.e., entering a user name and password or other secure information to gain access to her profile) a synthetic environment. While a person generally accesses a synthetic environment by logging into her user account (i.e., user), it is foreseeable that a user can automatically, semi-automatically, or manually log into a synthetic environment, in some examples. Further, a user's login status (i.e., a data indication as to whether a user is logged in (i.e., "in game") or logged out of (i.e., "out of game") a synthetic environment. Conversely, "user," in some examples, does not refer to a person or entity (e.g., an organization, institution, or others), living, dead, fictitious, or otherwise, but instead to the instantiation of data used by a computer to represent a person or entity.

In some examples, a synthetic environment may be implemented using a shard or shardless computing environment. In other words, a synthetic environment implementing techniques such as those described herein may be implemented with or without shards that provide one or more instances of the synthetic environment. A synthetic environment, in some examples, may be implemented using one, some, few, many, or no shards (i.e., shardless). As an example, a virtual world (i.e., synthetic environment) may be implemented using a single shard. As another example, a synthetic environment may be implemented using multiple shards. As a further example, a synthetic environment providing the described techniques may be implemented using a shardless computing environment. In other examples, a synthetic environment may be implemented using a cross-shard (i.e., transmitted, or communicated between shards (i.e., server-based instances of a synthetic environment), servers or operating systems) platform. The described techniques may be used to generate a data feed (hereinafter "feed") comprising dynamic content (e.g., content, data, or information generated from game play or character interaction with a synthetic environment (i.e., virtual world) in real time) associated with the character and the synthetic environment. As an example, a feed may be transmitted between shards to one or more "clients" (e.g. mobile phones, smart phones, personal digital assistants (PDAs), desktop computers, servers, notebooks, or other data communication device, without limitation) and configured to present the data to end devices or clients associated with the synthetic environment in substantially real time.

In other examples, data and information associated with a synthetic environment, character, account, avatar, character, or any other aspect of a synthetic environment may be transmitted to end devices or clients (e.g., mobile phone, smart phone, PDA, mobile computing device, desktop computer, notebook computer, server, computing network, or any other type of client, server, node, terminal, or other networking element) configured to receive data inside or outside of a synthetic environment on the Internet, World Wide Web ("web"), or other data network, for various purposes. As an example, feed data may be used to locate other users or "friends" (i.e., users associated with a given user and identified on, for example, a list) within a synthetic environment using a radar-like mechanism that allows a user to view the real-time or substantially real-time game, grid, world, or environmental locations associated with each user or friend. As another example, a "ticker tape"-like feed may be used to provide information associated with a user's friends while the user is logged in or out of the synthetic environment using a web, mobile, desktop, or any other type of client. The appearance, content, format, layout, or other aspects of a feed may be varied (e.g., adapting a feed to appear on a web browser on a mobile phone or smart phone as opposed to being fed and displayed on a display associated with a desktop computer). A user does not need to be logged into an account within a game, virtual, or synthetic environment in order to receive data associated with the synthetic environment. The described techniques may be varied in design, function, implementation, order, configuration, layout, format, or other technical aspects and are not limited to the examples provided.

FIG. 1 illustrates an exemplary system for synthetic environment character data sharing. Here, system 120 includes network 122, game server or server (hereinafter "server") 124, repository 126, client 128, gaming console 130, wireless clients 132-136, portable gaming device 138, networked clients 140-144, client 146, and set top box 148, graphical user interface ("interface") 150. In some examples, interface 150 may be accessed from any type of endpoint, device, client, peer, or the like, including clients 128-148. Clients 128-148 may be wired, wireless, mobile, and in data communication with server 124 using any type of public or private data network or topology. Interactive set top box ("set top box") 148, in some examples, may be implemented as a digital media box, converter, or other device that converts digital signals for display, interaction, recording, or other purposes. Examples of set top box 148 may include interactive set top boxes, digital television set top boxes, encoders, converters, or other devices configured to convert data and signals transmitted over network 122. In some examples, set top box 148 may be an interactive set top box provided by cable, media, entertainment, or other companies, individuals, entities, or organizations that provide content (i.e., media configured for display, play, recording, playback, or other functions using set top box 148) using any type of transmission media (e.g., digital signals transmitted from a central office using twisted pair copper lines, coaxial cable, fiber optic, or others). For example, set top box 148 may an interactive set top box that is configured to allow users to interact with a synthetic environment, including receiving information regarding their account, game play, friends (i.e., other users identified on a "friends," guild, or other type of list indicating permission to exchange and share information), friends' location in or out of game, the location of other users' clients, or other information as described below. The type, quantity, configuration, features, functionality, or other aspects of set top box 148 may be varied and are not limited to the examples provided. Further, a game server (e.g., server 124) may be configured as a physical machine that is configured to implement (e.g., install and execute) a server, client, or client-server-based application in order to instantiate a synthetic environment. In some examples, a synthetic environment and user accounts configured to interact with the synthetic environment may be implemented as a set of game processes and/or game sub-processes that are intended to provide functionality such as applications, features, and functionality within a synthetic environment. For example, if an auction-type feature is desired for user interaction within a synthetic environment, a game server (e.g., server 124) may be configured to manage auctions for items (e.g., weapons, food, drink, characters, gold, currency, or other items within a game environment (i.e., synthetic environment) and allow users to bid, sell, or otherwise participate in an auction. As another example, if the ability to enable users' characters to engage in combat is desired, a game process and/or game sub-processes may be configured to implement combat within the synthetic environment. Other examples may be implemented using any number, type, or configuration of game servers (e.g., server 124), without limitation. In other examples, the number, type, configuration, and topology of system 120, network 122, clients 128-148, and server 124 may be varied and are not limited to the descriptions provided.

Here, any of clients 128-148 and server 124 may access network 122 using interface 150. In some examples, interface 150 may be associated with a common, shared, or otherwise connected ("connected") application that allows users to view, read, and access other users' generated data. In other examples, network application 120 and the above-described elements may be implemented differently and are not limited to the descriptions provided.

Figure 2:
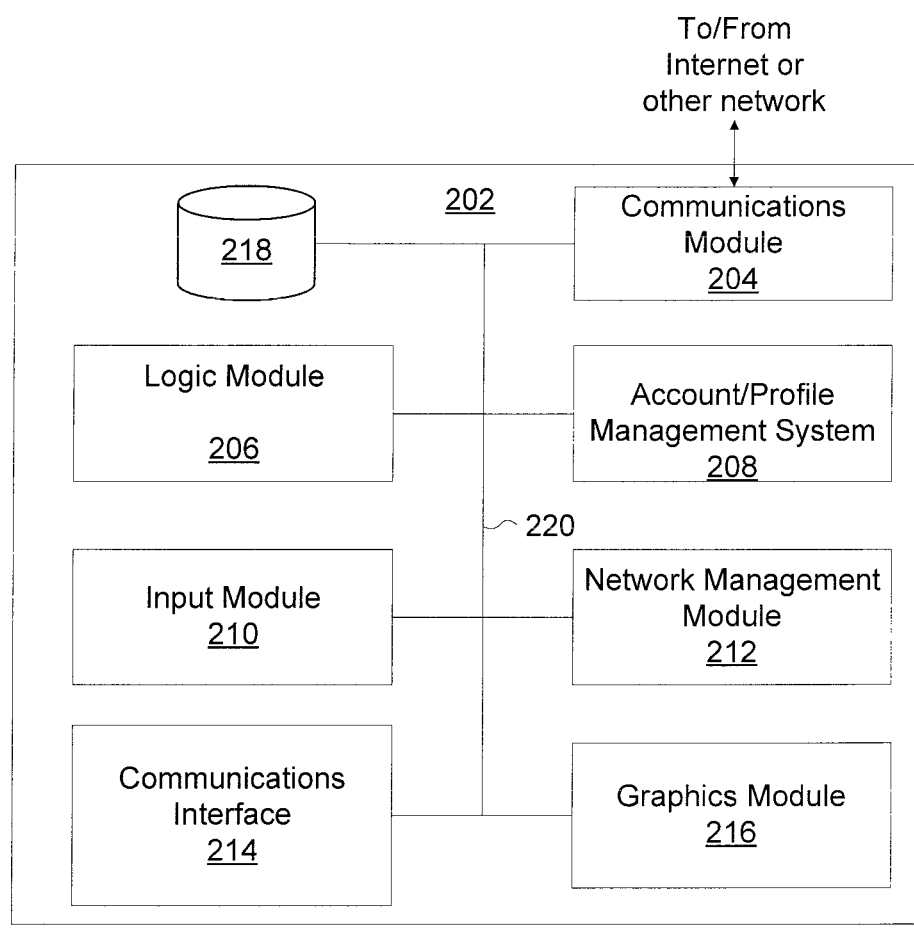
FIG. 2 illustrates an exemplary application architecture for synthetic environment character data sharing.

FIG. 2 illustrates an exemplary application architecture for synthetic environment character data sharing. Here, application 202 includes communications module 204, logic module 206, account/profile management system 208, input module 210, network management module 212, communications interface 214, graphics module 216, repository 218 and bus 220. In some examples, repository 218 may be implemented as a database, data mart, data warehouse, storage area network (SAN), redundant array of independent disks (RAID), or other storage facility. In other examples, repository 218 may be implemented differently than as described above.

Here, communications module 204 is configured to manage logic module 206, account/profile management system 208, input module 210, network management module 212, communications interface 214, graphics module 216, and repository 218 by generating and transmitting control signals and data over bus 220. In some examples, bus 220 may be implemented using any type of messaging mechanism, without limitation. For example, bus 220 or any type of messaging mechanism may be implemented using any type of messaging protocol, system, object classes, or, in some examples, transitory storage mechanisms (e.g., cache), or the like. In other examples, bus 220 may be replaced by using messaging mechanisms (e.g., protocols, systems, or classes) implemented with storage facilities, databases, or repositories, such as using a database management system or repository (e.g., repository 218), distributed memory system or cache (e.g., Memcached, or others), or others. In still other examples, other messaging mechanisms that may be used instead of bus 220 include HTTP, Berkeley sockets based APIs, or others. As described below, communications module 204, in association with some, none, or all of logic module 206, account/profile management system 208, input module 210, network management module 212, communications interface and protocol determination module 214, graphics module 216, and repository 218, may be used to implement the described techniques.

In some examples, communications module 204 provides data input from and output to an operating system, display, network or other application configured to implement application 202. In some examples, data input to communications module 204 may be a parameter, data, or other input (e.g., RSS structured data, unstructured data) associated with a synthetic environment (e.g., a persistent virtual world, game environment, or the like may be implemented using any type of computing system architecture configured to implement an artificial environment in which users (e.g., players) may interact using characters, avatars, or other virtual, multimedia-implemented constructs). In other examples, data input to or information output from communications module 204, logic module 206, account/profile management system 208, input module 210, network management module 212, and graphics module 216 may be received or sent using communications interface 214.

In some examples, data associated with an interaction between a character and a synthetic environment may be generated by account/profile management system 208, input module 210 and graphics module 216. The data may be configured for transmission using network management module 212 and communications interface 214. Communications module 204 and communications interface 214 may be configured to receive, interpret, handle, or otherwise manage input received from the internet of other network. In other examples, application 202 and the above-described elements may be implemented differently and are not limited to the descriptions provided.

Figure 3A:
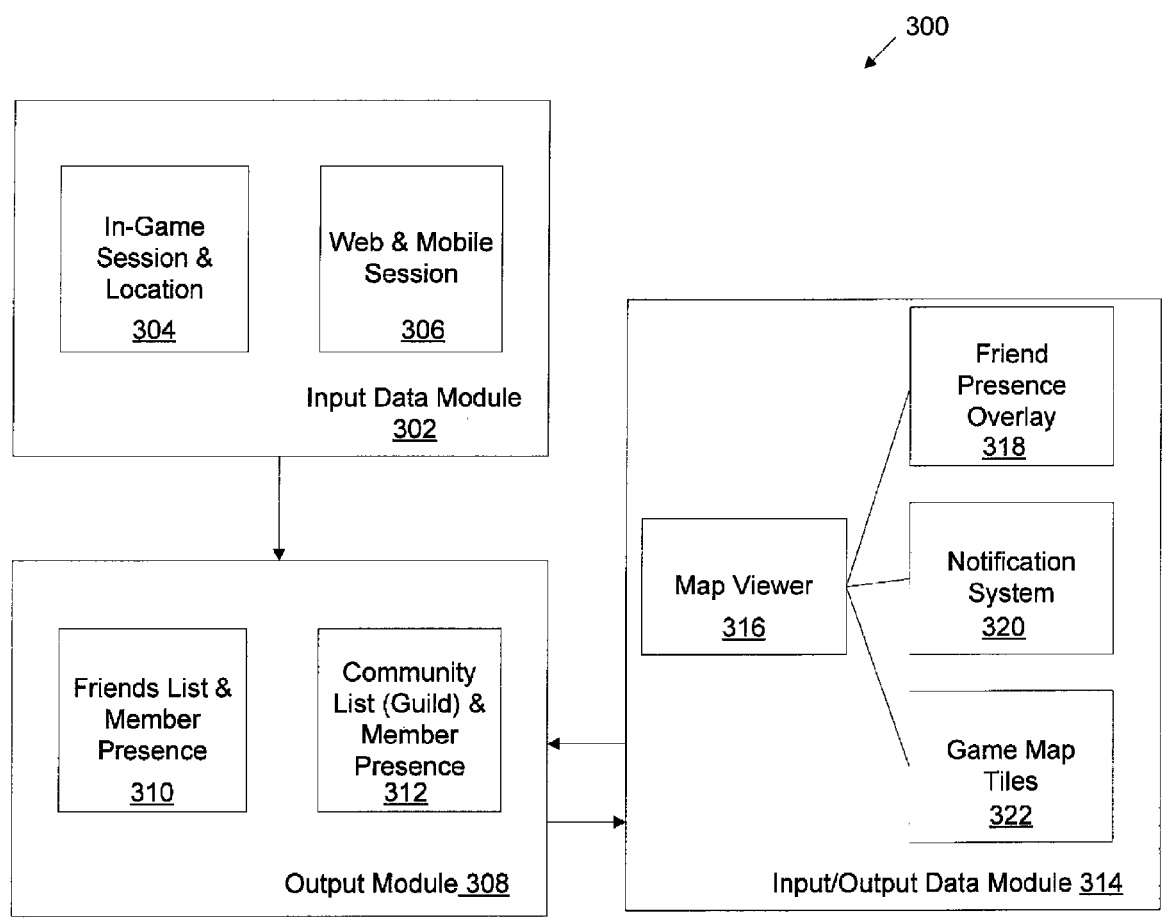
FIG. 3A illustrates another exemplary application architecture for synthetic environment character data sharing.

FIG. 3A illustrates another exemplary application architecture for synthetic environment character data sharing. Here, application 300 includes input data module 302, output data module 308, and input/output data module 314. Further, input data module 302 includes in-game session & location 304 and web & mobile session 306. Output data module 308 includes friends list & member presence 310 and community (guild) & member presence 312. Input/output data module includes map viewer 3316, friend presence overlay 318, notification system 320 and game map tiles 322. In some examples, application 300 may be configured to manage data transmission over a data communication link or path ("data communication path") between recipients (e.g., sending or source user account, end devices, destination accounts (i.e., user accounts identified on a user's friends list, guild list, or other grouping or collection of addresses, indicators, user names, or other account identifiers), or other receiving accounts of messages sent by from an account).

Each of input data module 302, output data module 308, input/output data module 314, in-game session & location 304, web & mobile session 306, friends list & member presence 310, community (guild) & member presence 312, map viewer 316, friend presence overlay 318, notification system 320 and game map tiles 322 may be implemented as a computer program, application, software, hardware, circuitry, or a combination thereof. Further, input data module 302, output data module 308, input/output data module 314, in-game session & location 304, web & mobile session 306, friends list & member presence 310, community (guild) & member presence 312, map viewer 316, friend presence overlay 318, notification system 320 and game map tiles 322 may also be portions of software code that are discretely identified here for purposes of explanation. Application 300 and the above-described modules may be implemented differently are not limited to the features, functions, configuration, implementation, or structures described above.

Here, input data module 302 includes in-game session & location 304 and web & mobile session 306. In some examples, input data module 302 and input/output data module 314 may be configured to generate character, event or activity data associated with an interaction between a character and a synthetic environment. Input data module 302 may be configured to transmit data to output data module 308 in real time or substantially real time. In some examples, in-game session & location 304 may be configured to generate, store and communicate data associated with a character account when the character account is logged into and interacting with or within the synthetic environment. In other examples, web & mobile session 306 may be configured to generate, store and communicate data associated with a character account when the character account is not logged into the synthetic environment. Web & mobile session 306 may be configured to implement character feed through the Internet through various data communication protocols (e.g., XMPP/Jabber, OSCAR, protocol for synchronous conferencing (PSYC), wireless application protocol (WAP), Really Simple Syndication (RSS), HTTP/REST, XML-RPC, Internet control message protocol (ICMP), Internet relay chat (IRC), Property Class™ as developed by Trion World Network®, Inc. of Redwood Shores, Calif., short messaging system (SMS), simple message transfer protocol (SMTP), or others) and configured to implement character feed through mobile communication devices through various mobile communication protocols (e.g. WAP (i.e., wireless application protocol, or others). Input data module 302 and the described elements may be varied in function, quantity, configuration, layout, appearance, design, or other aspects or attributes and are not limited to the examples shown and described.

Here, input/output data module 314 includes map viewer 316, friend presence overlay 318, notification system 320 and game map tiles 322. In some examples, input/output data module 314 may be configured to transmit data to and receive data from output data module 308 in real time or substantially real time. Input/output data module 314 may be configured to extract and present data to an operating system, display, network or other application configured to implement application 300. Input/output data module 314 and the described elements may be varied in function, quantity, configuration, layout, appearance, design, or other aspects or attributes and are not limited to the examples shown and described.

In some examples, map viewer 316 may be configured to generate, extract and present data associated with an interaction between a character and a synthetic environment. Map viewer 316 may be configured to send data to and receive data from friends presence overlay 318, notification system 320 and game map tiles 322. Map viewer 316 may be configured to represent a virtual geographic layout of the synthetic environment. In some examples, the location of character accounts within the synthetic environment may be depicted on map viewer 316. In some examples, friend presence overlay 318 and game map tiles 322 may be configured to transmit data to and receive data from map viewer 316. Game map tiles 322 may be configured to represent a segment of the virtual layout of the synthetic environment. The configuration, layout, appearance, design, or other aspects or attributes of map viewer 316 may be varied and are not limited to the examples shown and described.

In some examples, notification system 320 may be configured to receive character data and generate messages for transmission in various output formats. Notification system 320 may be configured to transmit data to friends list & member presence 310, community list (guild) and member presence 312 and map viewer 316. Notification system 320 may also be configured to communicate across various types of data communication interfaces (e.g., application programming interface ("API"), which may be configured for communicating data and information between a synthetic environment and another application, operating system, or operating system). Notification system 320 may be implemented differently and is not limited to the description or examples provided.

Here, output data module 302 includes friends list & member presence 310 and community list (guild) & member presence 312. In some examples, output data module 308 may be configured to receive data from input data module 302 and transmit data to and receive data from input/output data module 314. Output data module 308 may be configured to extract and present data to an operating system, display, network or other application configured to implement application 300. In some examples, friends list & member presence 310 and community list (guild) & member presence 312 may be configured to be presented as a news ticker, an email, a chat dialogue, RSS feed, or others. In other examples, the presentation of friends list & member presence 310 and community list (guild) & member presence 312 may be varied and are not limited by the descriptions provided.

In some examples, friends list & member presence 310 may be configured to present data or information associated with a designated character account. For example, a user may specify other character accounts for inclusion in their friends list. Once included on a user's friends list, information related to the designated character account may be dynamically updated to reflect the real time activity of the designated character within the synthetic environment. For example, information such as weaponry status, geographic location or quest status may be communicated to and presented by friends list & member presence 310. In other examples, community list (guild) & member presence 312 may be configured to present data or information associated with a designated guild (e.g., an organized group of players working together). Output data module 302 and the described elements may be varied in function, quantity, configuration, layout, appearance, design, or other aspects or attributes and are not limited to the examples shown and described.

Figure 3B:
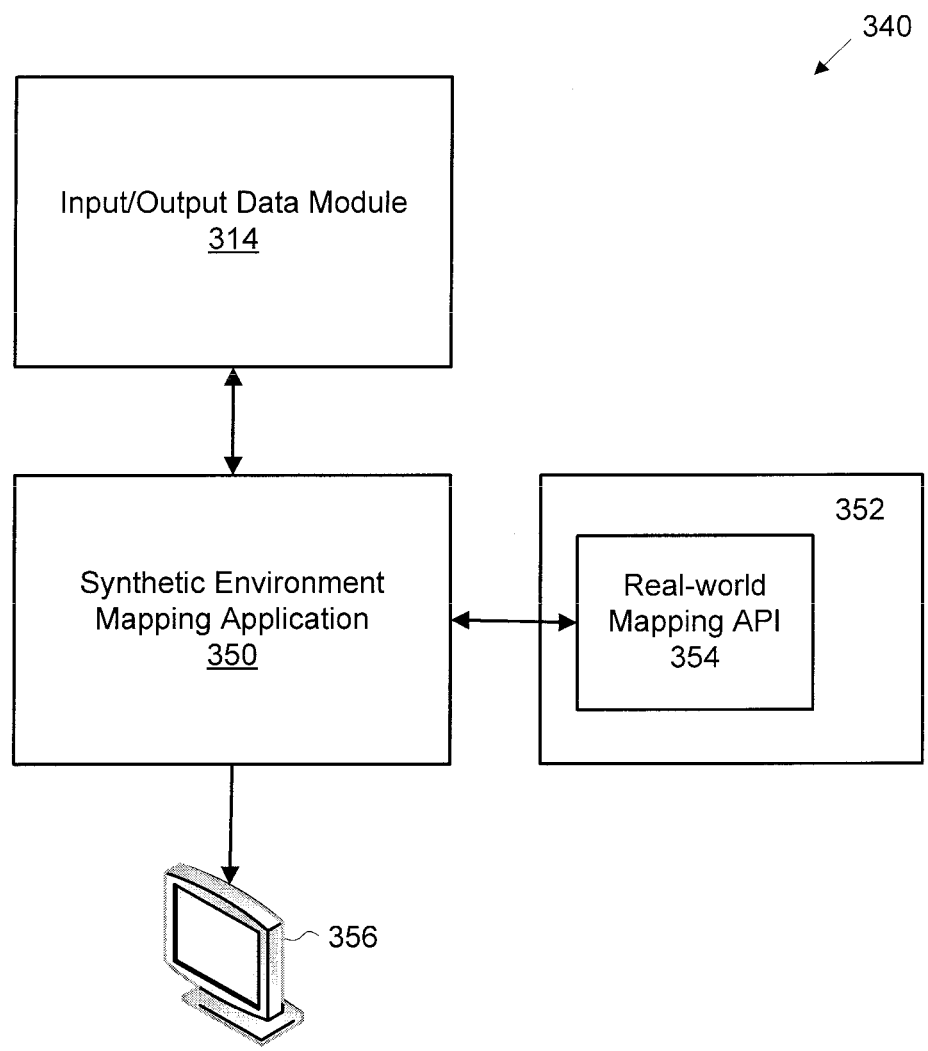
FIG. 3B illustrates an exemplary application architecture for synthetic environment mapping.

FIG. 3B illustrates an exemplary application architecture for synthetic environment mapping. Here, system 340 includes input/output data module 314, which may be implemented similarly or substantially similar to the same numbered element as described above in connection with FIG. 3A. In some examples, system 340 may be illustrative of an application architecture that may be used to implement a mapping application, feature, or function for use within or without a synthetic environment. For example, system 340 also, in some examples, includes synthetic environment mapping application 350, which may be in data communication with input/output data module 314 and real-world mapping application 352, the latter using, as an example, real-world mapping application programming interface (hereinafter "API") 354. As shown and described, a graphical display may be presented on an interface (e.g., display 356, a computer monitor, liquid crystal display screen, or other type of interface) that allows location data to be visually represented. In other words, synthetic environment mapping application 350, using input data from both input/output data module 314 and real-world mapping API 354, may be configured to visually display (on display 356) locations for a user when either in-game or out-of-game (i.e., when a user is logged into a synthetic environment, the location of a user's character or, a user's physical, real-world location). In other examples, system 340 may be configured differently and is not limited to the examples shown and described.

Figure 4A:
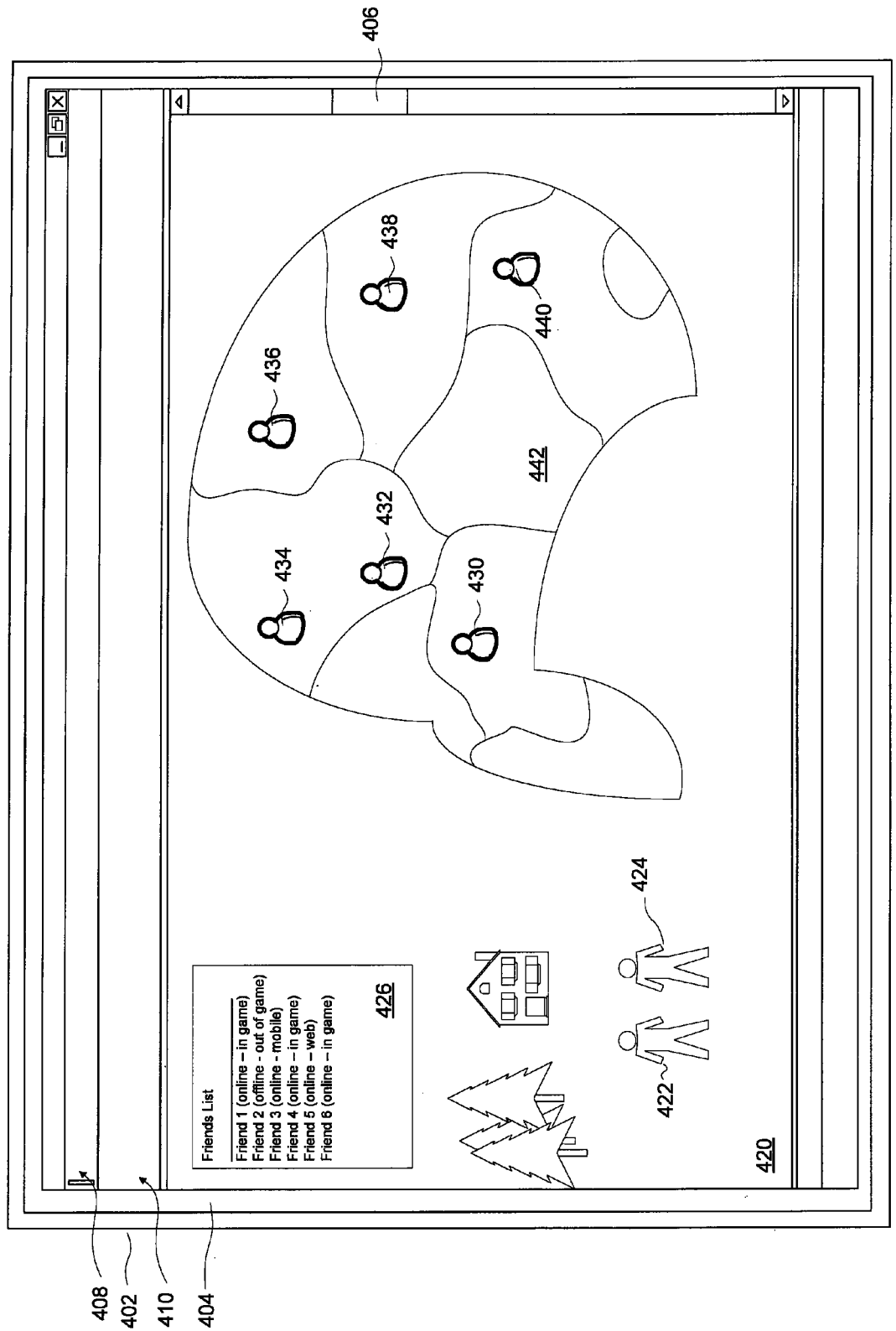
FIG. 4A illustrates an exemplary interface configured to present data and information associated with a synthetic environment character.

FIG. 4A illustrates an exemplary interface configured to present data and information associated with a synthetic environment character. Here, interface 402 includes display 404, scroll bar 406, tool bar 408, menu bar 410, synthetic environment 420, virtual users 422-424, friends list 426, virtual users 430-440 and map viewer 442. In some examples, synthetic environment 420, virtual users 422-424, friends list 426, virtual users 430-440 and map viewer 442 are presented in display 404, which provides examples of how data associated with character feed may be presented on an interface associated with a destination account or recipient. In other examples, synthetic environment 420, virtual users 422-424, friends list 426, virtual users 430-440 and map viewer 442 may be presented elsewhere and are not limited to the examples provided. Interface 402 and the described elements may be varied in function, quantity, configuration, layout, appearance, design, or other aspects or attributes and are not limited to the examples shown and described.

As shown here, synthetic environment 420 is a persistent virtual world populated by virtual users 422-424 and virtual users 430-440. In some examples, virtual users 422-424, friends list 426, virtual users 430-440 and map viewer 442 are associated with synthetic environment 420. In other examples, virtual users 422-424, friends list 426, virtual users 430-440 and map viewer 442 may be associated with other network communication systems (e.g. mobile communication device, distributed data network, or others). In still other examples, virtual users 422-424, friends list 426, virtual users 430-440 and map viewer 442 may be associated with other communication systems and are not limited to the description provided.

Here, data associated with character feed may be presented in friends list 426 and map viewer 442. In other examples, data associated with character feed may be presented in another communication application (e.g. electronic mail, instant messenger, mobile text messenger, peer-to-peer chat, or others). In other examples, data associated with character feed may be presented in another communication application and is not limited to the descriptions provided. In some examples, the data associated with character feed may include a presence status (e.g. whether or not a user is logged into or logged out of synthetic environment 420), or geographical location (e.g., the virtual physical location of a user within synthetic environment 420). In other examples, the data associated with character feed may include another status associated with a user account or other characteristics related to a user account. In still other examples, the data associated with character feed may include other data and is not limited to the descriptions provided.

As shown in friends list 426, friends 1-6 are users associated with synthetic environment 420. In some examples, friend 1, 4 and 6 may be logged into the game (i.e., "online—in-game"), friend 2 may be logged out of the game (i.e., "offline—out-of-game") and friend 3 may be logged out of the game but associated with another communication system (e.g., mobile communication device, distributed data network, or others) as described above. As another example, real-world locations of devices used by users associated with friends 1-6 may be presented on interface 402 using any type of visual, graphical, or other type of display. In other words, user "presence" may be implemented using various techniques, including displaying a user's login status, location within a synthetic environment, real-world location, or other data associated with a given user. In other examples, users associated with synthetic environment 420 may be associated with other communication systems, either within or outside a synthetic environment, and are not limited to the descriptions provided. In some examples, users may configure friends list 426 by inputting rules, filters, preferences, parameters, or other attributes in order to receive data or information associated with other accounts. In other examples, users may configure their accounts by inputting rules, filters, preference, other attributes to specify or limit the data or information available to others regarding their account. In still other examples, friends list 426 may be configured, implemented, designed or function differently and is not limited to the examples provided.

Here, the geographic locations of virtual users 430-440 within synthetic environment 420 are depicted in map viewer 442. In some examples, the different quadrants of map viewer 442 may represent different shards (i.e., server-based instances of a synthetic environment), servers or operating systems) within synthetic environment 420. In other examples, map viewer 442 may be varied in design, function, implementation, order, configuration, layout, format, or other technical aspects and is not limited to the examples provided.

Figure 4B:
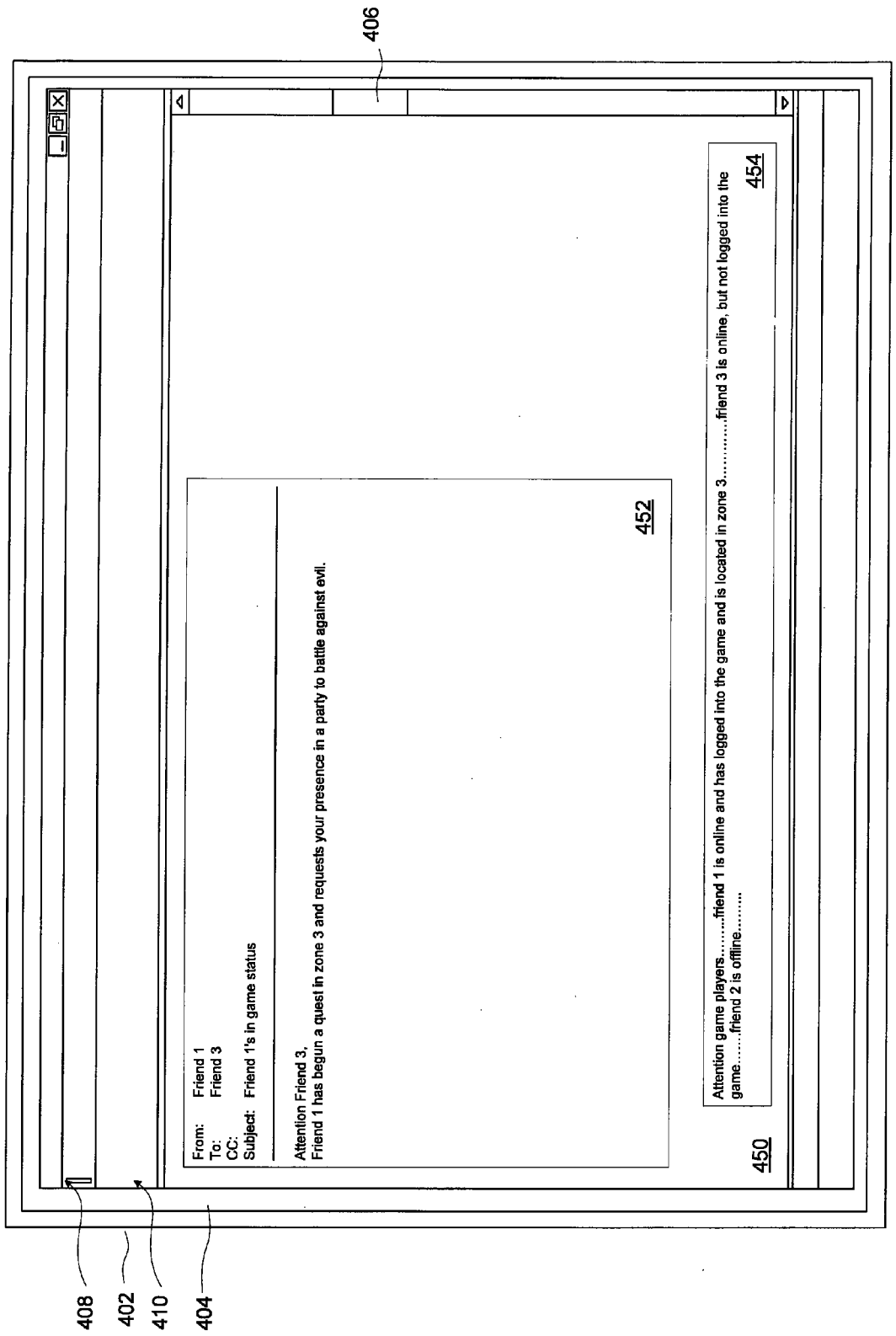
FIG. 4B illustrates an alternative exemplary interface configured to present data and information associated with a synthetic environment character.

FIG. 4B illustrates an alternative exemplary interface configured to present data and information associated with a synthetic environment character. Here, interface 402 includes display 404, scroll bar 406, tool bar 408, menu bar 410, internet application 450, email 452 and news ticker 454. In some examples, web application 450, email 452 and news ticker 454 are presented in display 404, which provide examples of how data associated with character feed may be presented on an interface associated with a destination account or recipient. In other examples, internet application 450, email 452 and news ticker 454 may be presented elsewhere and are not limited to the examples provided. Interface 402 and the described elements may be varied in function, quantity, configuration, layout, appearance, design, or other aspects or attributes and are not limited to the examples shown and described.

Here, data associated with character feed is presented in email 452 and news ticker 454. As shown here, internet application 450, email 452 and news ticker 454 may be associated with a distributed data network. In other examples, internet application 450, email 452 and news ticker 454 may be associated with other network communication systems (e.g. mobile communication device, or others). In still other examples, internet application 450, email 452 and news ticker 454 may be associated with other communication systems and are not limited to the descriptions provided. The described techniques may be varied in design, function, implementation, order, configuration, layout, format, or other technical aspects and are not limited to the examples provided.

Figure 4C:
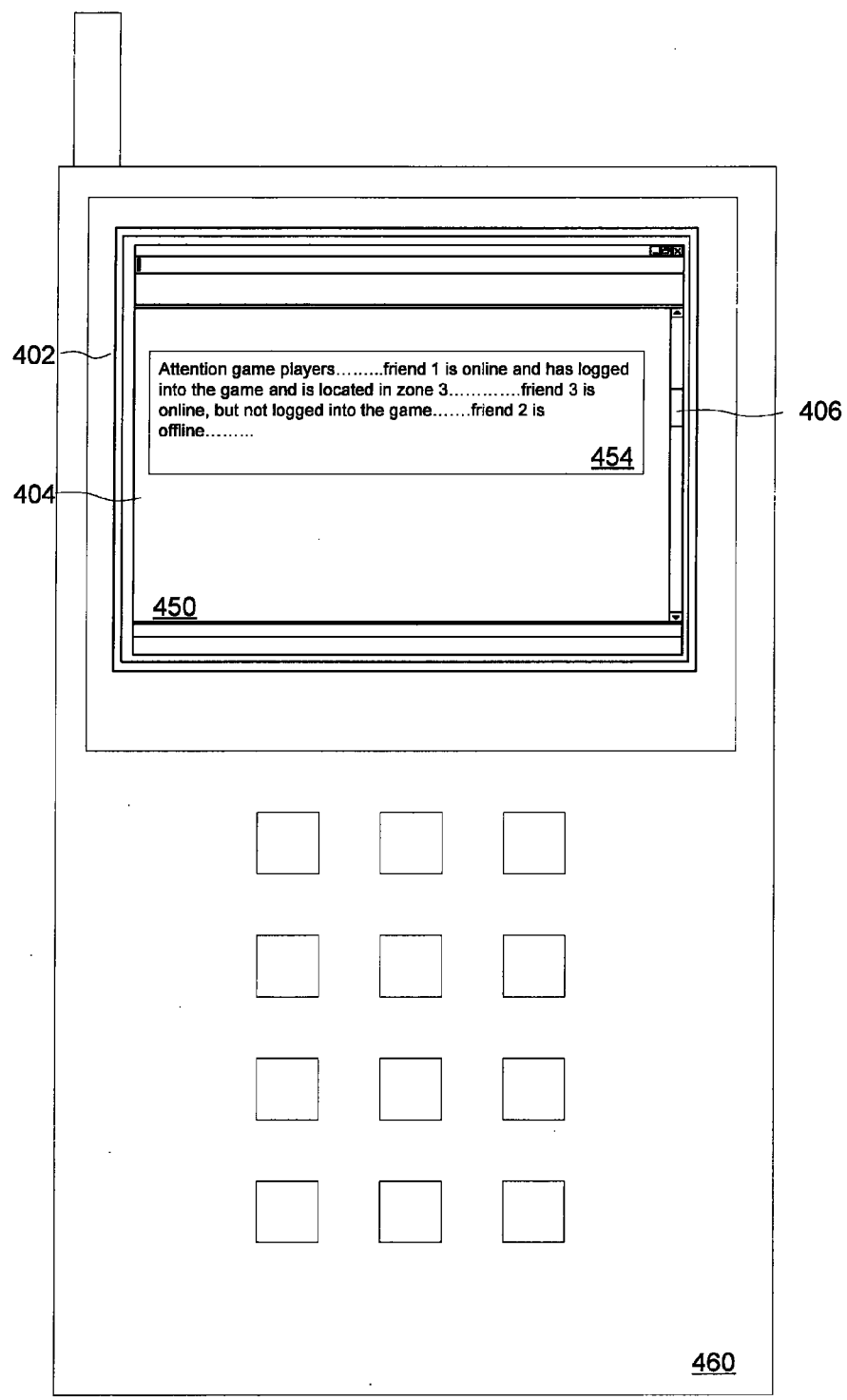
FIG. 4C illustrates a further alternative exemplary interface depicting synthetic environment character data sharing.

FIG. 4C illustrates a further alternative exemplary interface depicting synthetic environment character data sharing. Here, mobile communication device 460 includes interface 402, display 404, scroll bar 406, internet application 450, and news ticker 454. In some examples, internet application 450, and news ticker 454 are presented in display 404, which provide examples of how data associated with character feed may be presented on an interface associated with a destination account or recipient. In other examples, internet application 450, and news ticker 454 may be presented elsewhere and are not limited to the examples provided. Interface 402 and the described elements may be varied in function, quantity, configuration, layout, appearance, design, or other aspects or attributes and are not limited to the examples shown and described.

Here, data associated with character feed is presented in news ticker 454. As shown here, internet application 450, and news ticker 454 may be associated with a mobile communication device. In other examples, internet application 450, and news ticker 454 may be associated with other network communication systems (e.g. distributed data network, or others). In still other examples, internet application 450, and news ticker 454 may be associated with other communication systems and are not limited to the description provided. The described techniques may be varied in design, function, implementation, order, configuration, layout, format, or other technical aspects and are not limited to the examples provided.

Figure 5A:
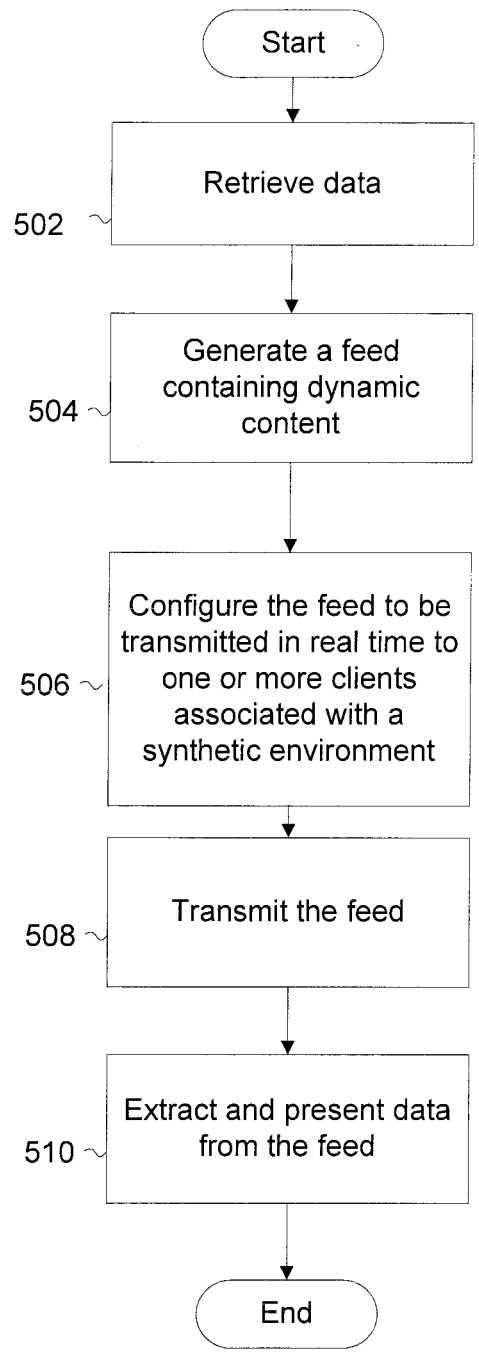
FIG. 5A illustrates an exemplary process for synthetic environment character data sharing.

FIG. 5A illustrates an exemplary process for synthetic environment character data sharing. Here, data is retrieved data from its source within a synthetic environment implemented across many shards using, for example, a metrics collection system (502). Data generation and storage is described in greater detail in the example provided in connection with FIG. 5B. Once retrieved, a dynamic and continuously updated feed is generated using the data (504). For example, the feed generated with the data may be continuously updated to reflect the real time status of the account. Once the feed is generated, it may be configured to present the data to one or more clients (e.g., end device such as a smart phone, cell phone, mobile computing or communications device, desktop computer, notebook/laptop computer, personal computer, server, and others) inside or outside of the synthetic environment (506). In some examples, the feed may be transmitted to one or more destinations. Configuring a feed for transmission to another account is described in greater detail in the example provided in connection with FIG. 5C. In other examples, multiple destinations may be identified to receive the message (508). After transmission, the feed may be extracted and presented (510). The above-described techniques may be implemented to process a message to multiple recipients using different data communication protocols, without limit. The above-described process may be varied in function, operation, processes, and performed in any arbitrary order and is not limited to the examples shown and described.

Figure 5B:
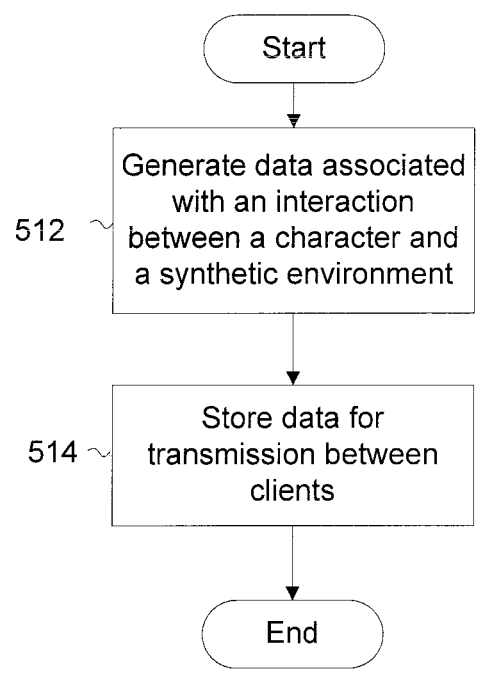
FIG. 5B illustrates an exemplary sub-process for synthetic environment character data sharing.

FIG. 5B illustrates an exemplary sub-process for synthetic environment character data sharing. In some examples, an interaction between a character and a synthetic environment may generate data (512). For example, data describing the status of an account (e.g. whether a user is "logged-in" or "logged out" of the synthetic environment or the location of a user within the synthetic environment) may be generated. After the data is generated, it may be stored by its source for transmission (514). The above-described process may be varied in function, processes and performed in any arbitrary order and is not limited to the examples shown and described.

Figure 5C:
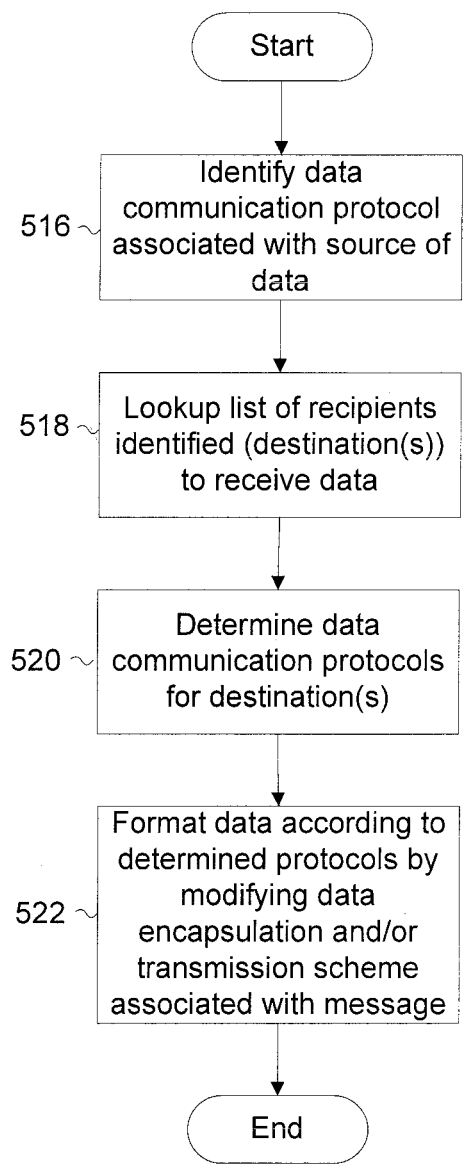
FIG. 5C illustrates an exemplary sub-process for synthetic environment character data sharing.

FIG. 5C illustrates an exemplary sub-process for synthetic environment character data sharing. In some examples, the described process may be implemented to configure a feed for receipt by one or more clients. Here, a data communication protocol associated with a message sent by an account is identified (516). A lookup operation or other function may be performed to identify one or more recipients (e.g., friends, email recipients, guild members, users, or other accounts associated with a synthetic environment) designated to receive a feed from the sending account (518). For example, a user may identify in her account a list of friends to receive a feed (e.g., emails, notifications, alerts, instant messages, and others) related to her activities or events affecting her within a synthetic environment. An account may be used to identify that a given recipient may wish to receive email using a mobile communication device, thus invoking the use of a protocol that may be different from other recipients. In other examples, the above-described techniques for identifying recipients (i.e., receiving user accounts) and data communication protocols may be modified and are not limited to the examples shown and described.

Once identified, a determination is made as to the type of data communication protocol being used by the one or more intended recipients (e.g., destinations) (520). Based on the determined data communication protocols, a feed may be formatted according to one or more protocols determined for transmitting data to a recipient using various techniques. In some examples, a feed may be formatted by modifying the data encapsulation scheme (i.e., method), algorithm, or structure associated with message data packets, segments, frames, or the like (522). Further, a feed may also be modified by adding, deleting, or modifying data included in, for example, headers, footers, trailers, error correction checksum numbers, payload data, and others. In other examples, the above-described techniques may be varied based on the type of protocol and are not limited to any specific protocol. Using the techniques described above, a feed may be sent by a user to multiple recipients who may be logged into an account associated with a synthetic environment, or who are outside of the synthetic environment, but able to receive a feed using, for example, email, instant messages, web tickers, news feeds, Really Simple Syndication ("RSS"), Atom, or other types of content syndication fees. The above-described process may be varied in function, processes and performed in any arbitrary order and is not limited to the examples shown and described.

Figure 6A:
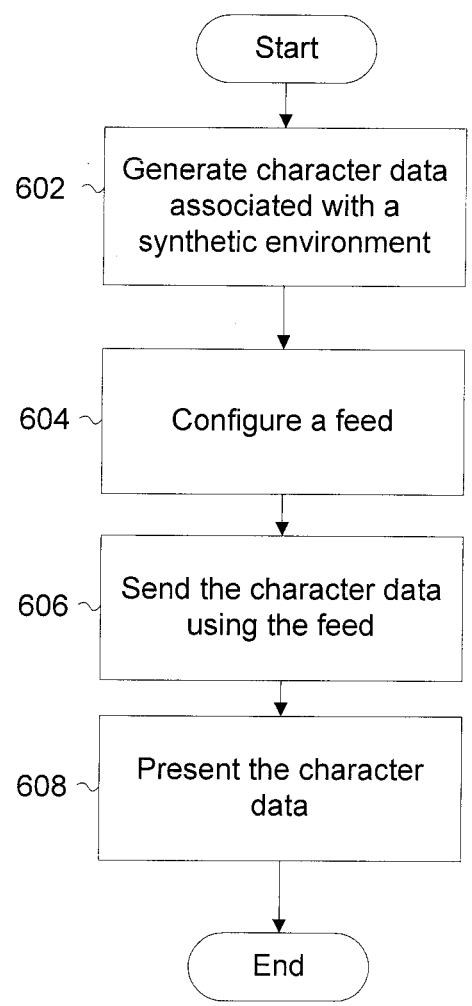
FIG. 6A illustrates an alternative exemplary process for synthetic environment character data sharing.

FIG. 6A illustrates an alternative exemplary process for synthetic environment character data sharing. In some examples, character data comprising dynamic content from one or more sources associated with a synthetic environment may be generated (602). In some examples, the synthetic environment may be executed across shards and may be accessed by end devices capable of receiving the data. Once the character data is generated, a feed may be configured (604). The feed may be used to send the character data in real time from its source to an end device (606). The character data may be presented at the end device (608). The above-described process may be varied in function, processes and performed in any arbitrary order and is not limited to the examples shown and described.

Figure 6B:
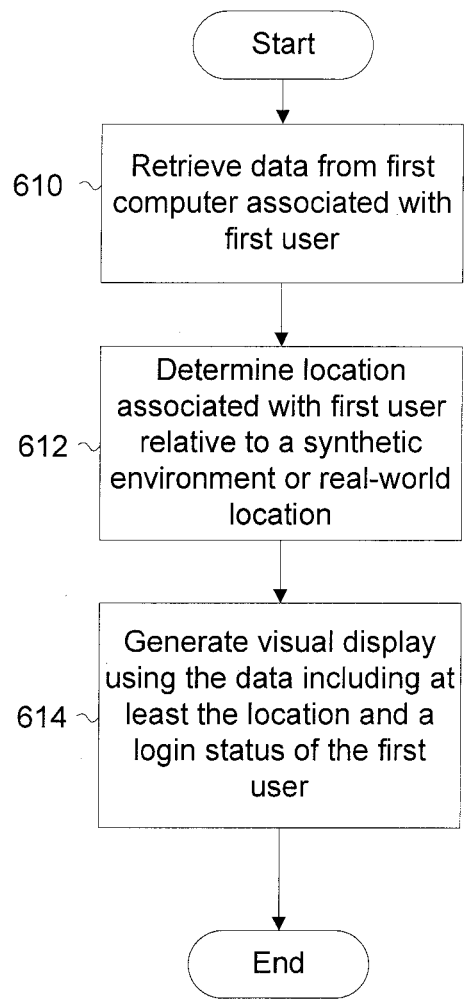
FIG. 6B illustrates another alternative exemplary process for synthetic environment character data sharing.

FIG. 6B illustrates another alternative exemplary process for synthetic environment character data sharing. In some examples, data is retrieved from a first computer associated with a first user (610). A first user may, for example, be listed on a friends list or guild list for one or more other users. After retrieving the data from, generally, a file associated with the first user, the data may be evaluated to determine a location associated with the first user (612). In some example, other attributes of a user may be determined including, but not limited to, a location, a login status, a movement status, a mode, or the like. Once determined, a synthetic mapping application (e.g., as described above in connection with FIG. 3B) may be used to generate a visual display representing the location or position of a user's character in a synthetic environment or a user in a real-world location (614). In other examples, the above-described process may be varied in steps, order, or functionality, without limitation.

Figure 6C:
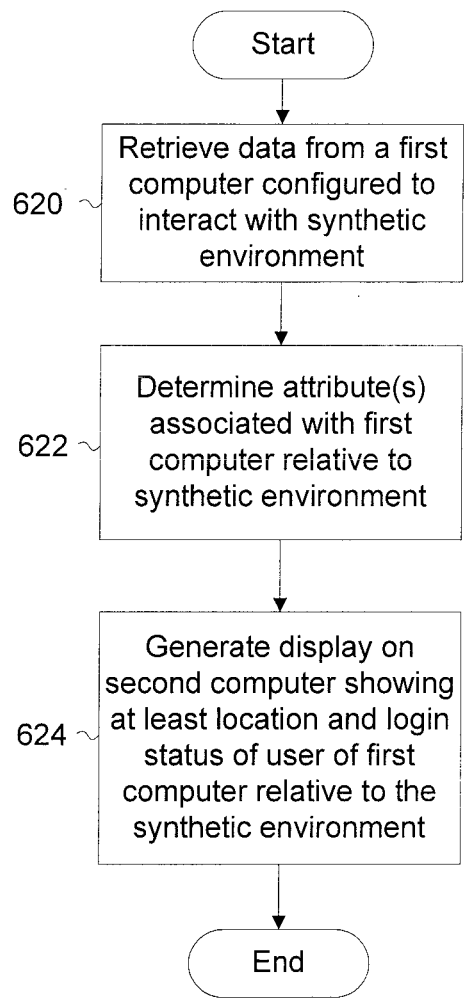
FIG. 6C illustrates yet another alternative exemplary process for synthetic environment character data sharing.

FIG. 6C illustrates yet another alternative exemplary process for synthetic environment character data sharing. Here, data may be retrieved from a first computer configured to interact with a synthetic environment (620). As described here and above in connection with FIG. 6B, data associated with a first computer may be stored as part of a file, document, or other data structure or construct that is stored on the first computer, a game server, or another computer, without limitation. Further, once retrieved, the data may be evaluated to determine one or more attributes (e.g., location, login status, or others) associated with the user in a real-time or near (i.e., substantially) real-time relative to a synthetic environment (622). Once attributes are determined, whether automatically or based on user input from, for example, a second user, a display is generated and presented on an interface or display associated with a second computer (e.g., a monitor or display screen of a computer, notebook, desktop, server, or the like) (624). In other examples, the above-described process may be varied in steps, order, or functionality, without limitation.

Figure 7:
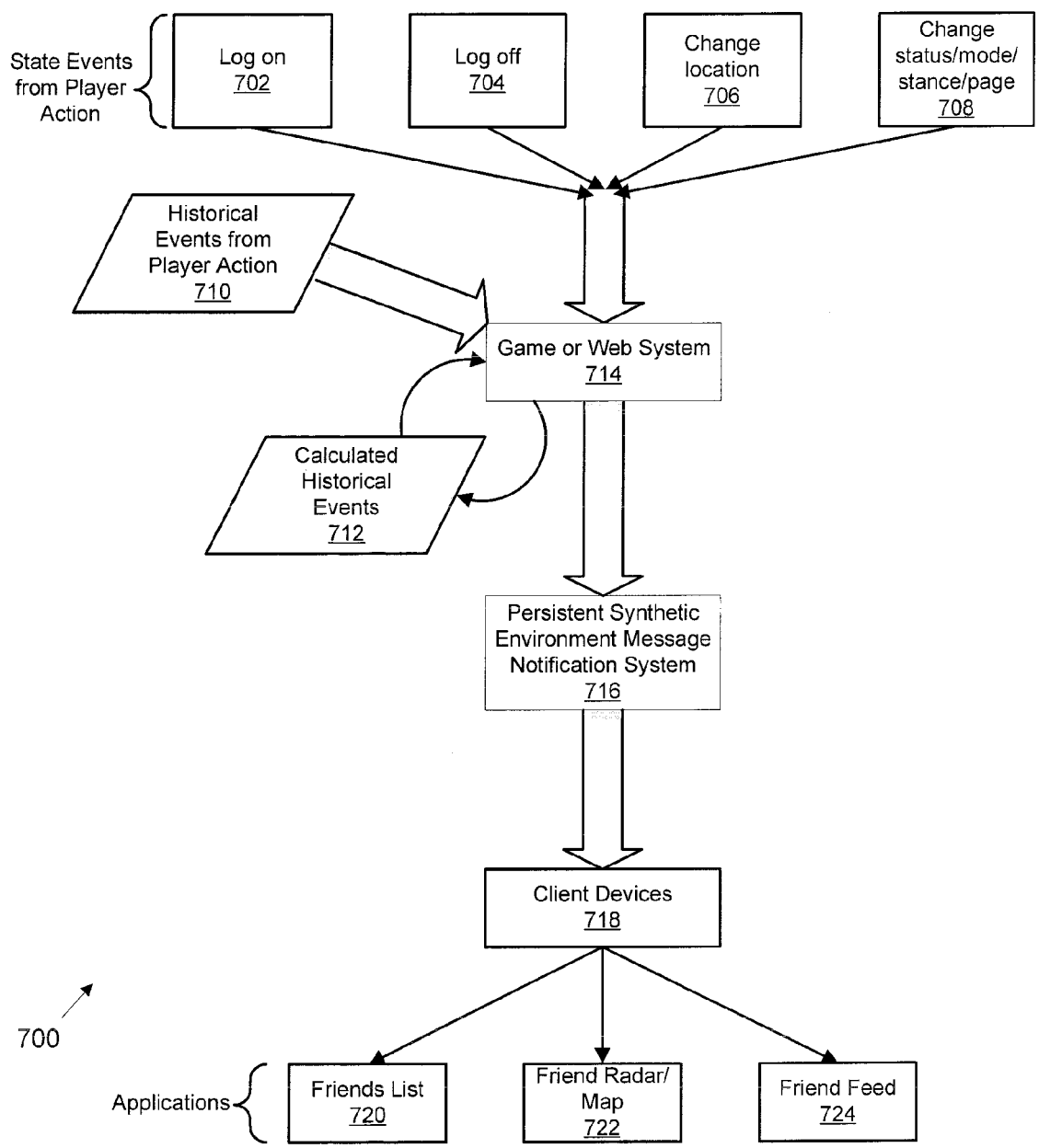
FIG. 7 is a state diagram of events in an exemplary synthetic environment character data sharing system.

FIG. 7 is a state diagram of events in an exemplary synthetic environment character data sharing system. Here, diagram 700 includes state events 702-708, historical events generated by a user (i.e., player), regardless of whether the user is logged into (i.e., in game) our out of (i.e., out of game) a synthetic environment (710), calculated historical events 716 that may be generated automatically or semi-automatically (i.e., subject to filter, criteria, rules, parameters, or other conditions established by a user or system administrator) by game or web system 714, persistent synthetic environment message notification system 716, client devices 718 (i.e., client devices may be implemented similarly or substantially similar to clients, as described above), and applications 720-724. In other examples, diagram 700 may be varied in terms of, for example, the type or quantity of state events 702-708, applications 720-724, or state machines (i.e., game or web system 714, persistent synthetic environment message notification system 716, client devices 718).

In some examples, state events resulting from user/player action may include logging into a synthetic environment (702), logging out of a synthetic environment (704), changing location (i.e., in or out of a synthetic environment) 706, or changing player status (e.g., active, inactive, live, dead, and others), player mode (e.g., movement, combat, planning, buying, selling, and others), stance (e.g., sitting, standing, defensive, offensive, and others), page (e.g., changing views within a web client to view a web page or site), or others. State events generated by user/player action (e.g., 702-708) may be input to game or web system 714 along with historical events generated from user/player action 710 (i.e., archived or past state events resulting from user/player action) and calculated historical events 712. For example, calculated historical events generated and evaluated by game or web system 714 may include the day and time within a synthetic environment, changing weather, altered terrain, battles, auctions, or other aspects of a synthetic environment that are not generated by user or player interaction. Taking into account one or more of events 702-712, game or web system 714 generates state data that is sent to persistent synthetic environment message notification system 716 that may be configured to transmit data for various types of clients 718 (e.g., web, mobile, PDA, HTML, XML, HTTP, RSS, and others). Data generated by synthetic environment message notification system 716 for further use by various applications (e.g., friends list 720 (i.e., an application that lists users as being "friends" of another user; this is distinguished from a guild list, which may be a list of users who are aggregated based on membership in an organization such as a guild that has common attributes among its members (e.g., trade or professional guilds based on a given skill set such as an archer, ranger, paladin, warrior, magician, cleric, other types of occupations or skills, or others), a friend radar or map (i.e., synthetic environment mapping application) that is configured to locate other users (e.g., friends, guild members, and others) within a synthetic environment. A synthetic environment mapping application may be configured to locate users' characters (e.g., avatars, icons, or other virtual representations of a player) within a synthetic environment. In some examples, a synthetic environment application may also be configured to locate one or more computers being used by a user in order to locate users outside of a synthetic environment (i.e., in a real-world environment). As an example, users may use a synthetic environment mapping application to identify the location of a given client device using various types of technologies (e.g., global positioning system (GPS), cell network triangulation using differential GPS or other technologies that may be used to provide a latitude/longitude or other coordinate for graphically presenting a location on a map, calculating a geographical proximity to an internet service provider's servers or a telecommunication service provider's central office, or others). In other examples, a synthetic environment mapping application may be configured to present a user's location within a synthetic environment or the user's location in the "real-world" using a displayed map. As an example of another application that may be configured to use state data as shown in diagram 700, friend feed 724 may be used to provide data associated with one user to another user using various types of formats (e.g., a "ticker-tape"-like feed), which may include information such as accomplishment-related events (e.g., User X has leveled up to Level 4, Character B has slain the Evil Dragon, Player W has successfully assaulted and taken Remagen using an airborne assault, User 5 has completed the Quest, and others) or state events (e.g., Player Erin has logged out of the Game, User Peter has moved to Castle Bay, User Lars has changed from movement mode to combat mode, Player Jon has logged into the Game, and others). In other examples, more, fewer, or different types of applications may be implemented apart from those shown and described. Further, diagram 700 and the described state events and applications may be described, designed, or otherwise implemented differently and are not limited to the examples shown and described.

Figure 8:
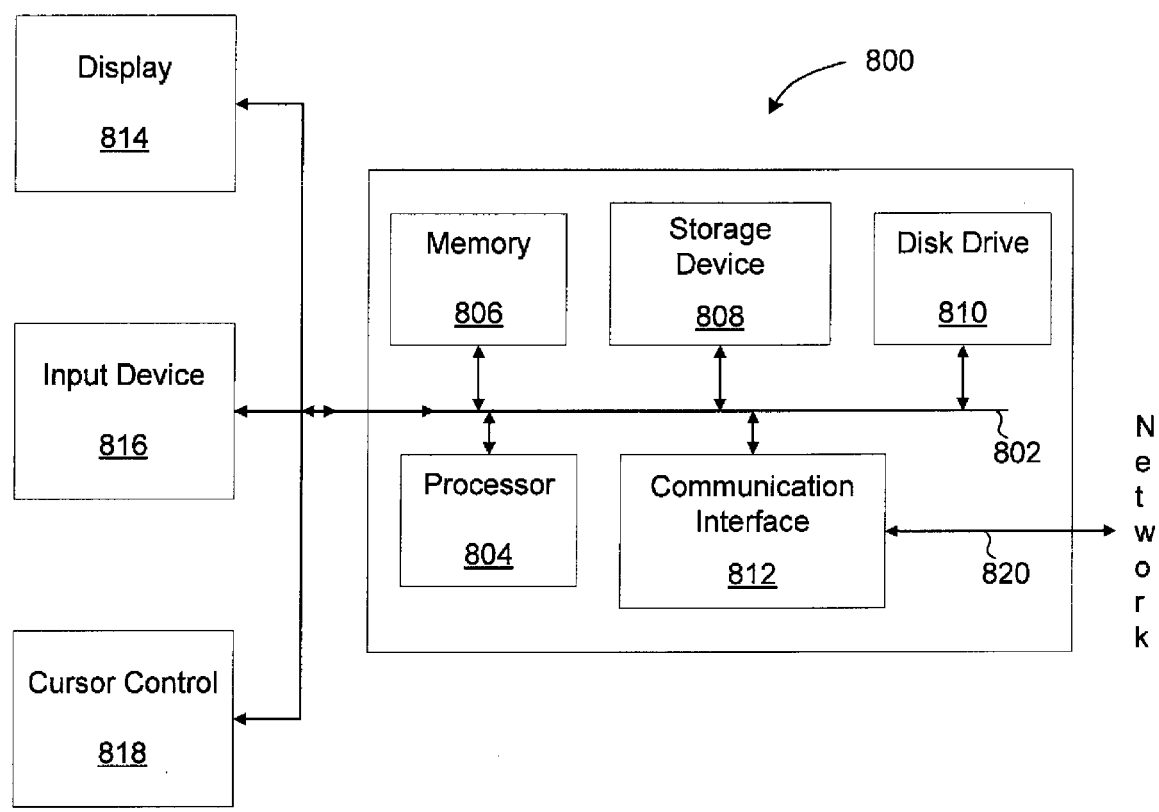
FIG. 8 illustrates an exemplary computer system suitable for synthetic environment character data sharing.

FIG. 8 illustrates an exemplary computer system suitable for synthetic environment character data sharing. In some examples, computer system 800 may be used to implement computer programs, applications, methods, processes, or other software to perform the above-described techniques. Computer system 800 includes a bus 802 or other communication mechanism for communicating information, which interconnects subsystems and devices, such as processor 804, system memory 806 (e.g., RAM), storage device 808 (e.g., ROM), disk drive 810 (e.g., magnetic or optical), communication interface 812 (e.g., modem or Ethernet card), display 814 (e.g., CRT or LCD), input device 816 (e.g., keyboard), and cursor control 818 (e.g., mouse or trackball).

According to some examples, computer system 800 performs specific operations by processor 804 executing one or more sequences of one or more instructions stored in system memory 806. Such instructions may be read into system memory 806 from another computer readable medium, such as static storage device 808 or disk drive 810. In some examples, hard-wired circuitry may be used in place of or in combination with software instructions for implementation.

The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks, such as disk drive 810. Volatile media includes dynamic memory, such as system memory 806.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by a single computer system 800. According to some examples, two or more computer systems 800 coupled by communication link 820 (e.g., LAN, PSTN, or wireless network) may perform the sequence of instructions in coordination with one another. Computer system 800 may transmit and receive messages, data, and instructions, including program, i.e., application code, through communication link 820 and communication interface 812. Received program code may be executed by processor 804 as it is received, and/or stored in disk drive 810, or other non-volatile storage for later execution.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A method, comprising:
    associating a first user as a second user's friend;
    associating the second user as the first user's friend, the second user being associated with a second computer;
    retrieving data from a first computer associated with the first user;
    determining a first login status associated with the first user relative to a synthetic environment and a second login status associated with the second user relative to the synthetic environment;
    in the event that the first login status indicates that the first user is logged into the synthetic environment:
        determining at least a location associated with the first user, the retrieving being performed in real-time or substantially real-time by accessing a file on a game server configured to store data associated with the first user and the second user;
        determining an attribute associated with the first user, wherein the determining of the attribute occurs in real-time or substantially real-time, wherein the attribute includes a changing player status, a player mode, a stance, or any combination thereof, wherein the changing player status indicates active, inactive, live, or dead, wherein the player mode indicates movement, combat, planning, buying, or selling, and wherein the stance indicates sitting, standing, defensive or offensive; and
        incorporating the first user's real-time or substantially real-time location and the attribute into a friends feed;
    in the event that the first login status indicates that the first user is not logged into the synthetic environment:
        determining at least a location associated with the first user in a real-world environment; and
        incorporating the location of the first user into a friends feed;
    formatting the friends feed according to a first format if the login status indicates that the second user is logged into the synthetic environment, and formatting the friends feed according to a second format if the login status indicates that the second user is not logged into the synthetic environment; and
    generating a visual display including the friends feed on a physical display associated with the second computer.

2. The method of claim 1 further comprising using the game server or a game sub-process server designated by the game server to retrieve the data and to determine at least the location, wherein the game server or the game sub-process server, the first computer, and the second computer are in data communication with each other using a client-server network topology.

3. The method of claim 1, wherein the first user is identified on a friends list of the second user.

4. The method of claim 1, further comprising determining the first user is associated with the second user by referencing a friends list stored in the file.

5. The method of claim 1, further comprising determining the first user and the second user belong to a guild.

6. The method of claim 1, wherein the first user is logged into the synthetic environment and the second user is logged out of the synthetic environment.

7. The method of claim 1, wherein the first user is logged out of the synthetic environment and the second user is logged into the synthetic environment.

8. The method of claim 1, wherein the first user and the second user are logged into the synthetic environment.

9. The method of claim 1, wherein the first user and the second user are logged out of the synthetic environment.

10. The method of claim 1, wherein the first computer is a client and the second computer is a web client configured to handle data communication using HTTP.

11. The method of claim 1, wherein a synthetic environment mapping application is configured to present a friend radar on the physical display associated with the second computer.

12. The method of claim 1, wherein a synthetic environment mapping application is configured to present the visual display, the visual display presenting at least the location and the login status of the first user, wherein the location is a real-time location of the first user regardless of whether the first user is logged into or logged out of the synthetic environment.

13. The method of claim 1, wherein the attribute includes a page indicating changing views within a web client to view a web page or site.

14. A method, comprising:
retrieving data from a first computer configured to interact with a synthetic environment by a game server, the first computer being associated with a first user, and the first computer and the game server being in data communication with each other and configured using a client-server network topology;
determining a login status associated with a second user relative to the synthetic environment, the second user being associated with a second computer, and the second user being associated as a friend of the first user;
determining one or more attributes associated with the first computer relative to the synthetic environment in real-time or substantially real-time by accessing a file updated by the first computer, the file being stored on the game server, wherein the one or more attributes includes a changing player status, a player mode, a stance, or any combination thereof, wherein the changing player status indicates active, inactive, live, or dead, wherein the player mode indicates movement, combat, planning, buying, or selling, and wherein the stance indicates sitting, standing, defensive or offensive;
formatting the one or more attributes according to a first format if the login status indicates that the second user is logged into the synthetic environment, and formatting the one or more attributes according to a second format if the login status indicates that the second user is not logged into the synthetic environment; and
generating a visual display including the friends feed on a physical display associated with the second computer.

15. The method of claim 14, wherein a synthetic environment mapping application is configured to be installed and executed on the game server in order to generate the display, the display presenting at least the location.

16. The method of claim 14, wherein a synthetic environment mapping application is configured to be installed and executed from the game server in order to generate the display, the display presenting at least the location.

17. The method of claim 14, wherein a synthetic environment mapping application is configured to display a graphical map of the synthetic environment and to present at least the location of a character being controlled by the first computer.

18. The method of claim 14, wherein a synthetic environment mapping application is configured to display a graphical map of the synthetic environment or a real world map configured to display the location of the first computer.

19. A system, comprising:
a database configured to store data associated with a synthetic environment, the data being generated by at least one of a first computer, a second computer, or a game server; and
a computer processor configured to:
associate a first user as a second user's friend, the first user being associated with a first computer and, the second user being associated with a second computer;
associate the second user as the first user's friend;
retrieve data from the first computer associated with a first user, determine a first login status associated with the first user relative to the synthetic environment and a second login status associated with the second user relative to the synthetic environment;
in the event that the first login status indicates that the first user is logged into the synthetic environment:
determine at least a location associated with the first user, the retrieving being performed in real-time or substantially real-time by accessing a file on the game server configured to store data associated with the first user and the second user;
determine an attribute associated with the first user, wherein the determining of the attribute occurs in real-time or substantially real-time, wherein the attribute includes a changing player status, a player mode, a stance, or any combination thereof, wherein the changing player status indicates active, inactive, live, or dead, wherein the player mode indicates movement, combat, planning, buying, or selling, and wherein the stance indicates sitting, standing, defensive or offensive; and
incorporate the first user's real-time or substantially real-time location and the attribute into a friends feed;
in the event that the first login status indicates that the first user is not logged into the synthetic environment:
determine at least a location associated with the first user in a real-world environment; and
incorporate the location of the first user into a friends feed;
format the friends feed according to a first format if the login status indicates that the second user is logged into the synthetic environment, and format the friends feed according to a second format if the login status indicates that the second user is not logged into the synthetic environment; and
generate a visual display including the friends feed on a physical display associated with the second computer.

20. A system, comprising:
a memory configured to store data associated with a first computer, a second computer, and a synthetic environment; and
a game server implemented using a client-server data network having one or more game processes or sub-processes implemented on the game server and being in data communication with one or more clients, the one or more game processes or sub-processes being configured to:
retrieve data from the first computer configured to interact with the synthetic environment by the game server, the first computer and the game server being in data communication with each other and configured using the client-server data network;
determine a login status associated with the second computer relative to the synthetic environment;
determine one or more attributes associated with the first computer relative to the synthetic environment in real-time or substantially real-time by accessing a file updated by the first computer, the file being stored on the game server, wherein the one or more attributes includes a changing player status, a player mode, a stance, or any combination thereof, wherein the changing player status indicates active, inactive, live, or dead, wherein the player mode indicates movement, combat, planning, buying, or selling, and wherein the stance indicates sitting, standing, defensive or offensive;
format the one or more attributes according to a first format if the login status indicates that the second computer is logged into the synthetic environment, and format the one or more attributes according to a second format if the login status indicates that the second computer is not logged into the synthetic environment; and
generate a display including the one or more attributes on the second computer.

21. The system recited claim 20, wherein the one or more clients includes at least the first computer and the second computer.

22. A computer program product embodied in a computer readable medium and comprising computer instructions for:
associating a first user as a second user's friend;
associating the second user as the first user's friend, the second user being associated with a second computer;
retrieving data from a first computer associated with a first user;
determining a first login status associated with the first user relative to a synthetic environment and a second login status associated with the second user relative to the synthetic environment;
in the event that the first login status indicates that the first user is logged into the synthetic environment:
determining at least a location associated with the first user, the retrieving being performed in real-time or substantially real-time by accessing a file on a game server configured to store data associated with the first user and the second user;
determining an attribute associated with the first user, wherein the determining of the attribute occurs in real-time or substantially real-time, wherein the attribute includes a changing player status, a player mode, a stance, or any combination thereof, wherein the changing player status indicates active, inactive, live, or dead, wherein the player mode indicates movement, combat, planning, buying, or selling, and wherein the stance indicates sitting, standing, defensive or offensive; and
incorporating the first user's real-time or substantially real-time location into a friends feed;
in the event that the first login status indicates that the first user is not logged into the synthetic environment:
determining at least a location associated with the first user in a real-world environment; and
incorporating the location of the first user into a friends feed;
formatting the friends feed according to a first format if the login status indicates that the second user is logged into the synthetic environment, and formatting the friends feed according to a second format if the login status indicates that the second user is not logged into the synthetic environment; and
generating a visual display including the friends feed on a physical display associated with a second computer.

23. A computer program product embodied in a computer readable medium and comprising computer instructions for:
retrieving data from a first computer configured to interact with a synthetic environment by a game server, the first computer and the game server being in data communication with each other and configured using a client-server network topology;
determining a login status associated with a second computer relative to the synthetic environment, the second computer and the game server being in data communication with each other and configured using the client-server network topology;
determining one or more attributes associated with the first computer relative to the synthetic environment in real-time or substantially real-time by accessing a file updated by the first computer, the file being stored on the game server, wherein the one or more attributes includes a changing player status, a player mode, a stance, or any combination thereof, wherein the changing player status indicates active, inactive, live, or dead, wherein the player mode indicates movement, combat, planning, buying, or selling, and wherein the stance indicates sitting, standing, defensive or offensive;
formatting the one or more attributes according to a first format if the login status indicates that the second user is logged into the synthetic environment, and formatting the one or more attributes according to a second format if the login status indicates that the second user is not logged into the synthetic environment; and
generating a display including the one or more attributes on the second computer.

* * * * *